United States Patent
Wang et al.

(10) Patent No.: US 8,300,442 B2
(45) Date of Patent: *Oct. 30, 2012

(54) POWER ADAPTATION DEVICE AND POWER SUPPLY MANAGEMENT METHOD

(75) Inventors: Ching-Shun Wang, TamShui (TW); Chun-Hua Hsia, TamShui (TW)

(73) Assignee: Advanced Connection Technology, Inc., TamShui (TW)

( * ) Notice: Subject to any disclaimer, the term of this patent is extended or adjusted under 35 U.S.C. 154(b) by 0 days.

This patent is subject to a terminal disclaimer.

(21) Appl. No.: 12/969,958

(22) Filed: Dec. 16, 2010

(65) Prior Publication Data

US 2011/0286250 A1     Nov. 24, 2011

Related U.S. Application Data

(63) Continuation-in-part of application No. 12/782,901, filed on May 19, 2010.

(51) Int. Cl.
    *H02M 1/00*     (2007.01)
(52) U.S. Cl. ........................................ 363/146
(58) Field of Classification Search .................. 363/146
See application file for complete search history.

(56) References Cited

U.S. PATENT DOCUMENTS

| | | | | |
|---|---|---|---|---|
| 4,237,385 A | * | 12/1980 | Jurgens et al. | 307/66 |
| 7,911,817 B2 | * | 3/2011 | Kasprzak et al. | 363/146 |
| 2011/0157939 A1 | * | 6/2011 | Wang et al. | 363/125 |

* cited by examiner

*Primary Examiner* — Jue Zhang
(74) *Attorney, Agent, or Firm* — Ditthavong Mori & Steiner, P.C.

(57) ABSTRACT

A power adaptation device and a power supply management method thereof are provided. The power adaptation device includes a terminal seat, a detection structure, a detection unit, an electric power modulation unit, an electric power modulation unit, and a control unit. The power supply management method includes the following steps. A detection result of the detection structure is read by the detection unit to judge whether the power terminal is electrically connected to the electronic device. The detection unit notifies the control unit that the power terminal is not connected to the electronic device when judging that the power terminal is not connected to the electronic device. The control unit controls the electric power modulation unit to stop supplying power to the electric power modulation unit to reduce a total power consumption of the electric power modulation unit.

16 Claims, 16 Drawing Sheets

POWER ADAPTATION DEVICE AND POWER SUPPLY MANAGEMENT METHOD

CROSS-REFERENCES TO RELATED APPLICATIONS

This non-provisional application is a continuation-in-part application of U.S. Ser. No. 12/782,901, filed on May 19, 2010, the entire contents of which are hereby incorporated by reference.

BACKGROUND OF THE INVENTION

1. Technical Field

The present invention relates to a power adaptation device and a power supply management method thereof, and more particularly to a power adaptation device which reduces static electric power loss thereof when the power adaptation device does not drive a load and a power supply management method thereof.

2. Related Art

With the development of electronic technologies, various digital electronic devices and consumptive electronic products are widely used in various application scenarios such as enterprises, household, and individuals. Electronic devices such as the computer, television, video recorder, multimedia video and audio player, printer, and copier need different power supplies (for example, providing a particular voltage, current or electric power) respectively in a working state. In order to enable the electronic devices to normally operate, it is an important topic to provide a stable electric power source conforming to specifications.

Generally, a common electronic device mostly includes many semiconductor elements driven by a direct current (DC) voltage of 3 V to 12 V, while a usual commercial power socket provides an alternative current (AC) voltage of 110 V to 220 V, so the commercial power is incapable of being directly applied to these electronic devices. Instead, the AC voltage of 110 V to 220 V is converted into a proper DC voltage through a power adapter, and then the power adapter supplies power to the electronic devices.

Generally, a conventional power adapter usually includes a metallic winding transformer, a rectification element, a voltage stabilizing circuit, and even a control circuit. When the conventional power adapter is connected to an external power (such as a commercial power socket), even if the power adapter is not connected to an electronic device load, the internal elements such as the metallic winding transformer, the voltage stabilizing circuit, and even the control circuit still cause a part of static electric power loss, and its loss power depends on a number of coils of the transformer, an iron core material, and the design of other internal elements.

However, currently, for a common power adapter, one end thereof is electrically connected to the commercial power socket directly, and the other end is an output interface for outputting electric energy to the electronic devices. In the application scenarios, the commercial power socket is not always disposed at a position convenient for a user to plug in or out the power adapter. Then, in use habits of the masses, no matter whether it is needed to drive an electronic device, the power adapter is fixedly coupled to a commercial power socket for a long time normally, and in this way, the power adapter that does not actually drive a load easily wastes energy sources.

In order to solve the problem, the present invention provides a power adaptation device and a power supply management method thereof, which has a special detection structure, so as to judge whether a power adaptation device is electrically connected to an electronic device, and can lower the total power consumption of the power adaptation device when it is judged that the power adaptation device is not connected to the electronic device, so as to solve the problem.

SUMMARY

In order to solve the problem that a conventional power adapter wastes energy sources, the present invention provides a power adaptation device, which is applicable to supplying power to an electronic device, and includes a terminal seat, a mechanical probing terminal, a detection unit, an electric power modulation unit, and a control unit.

The probing terminal is movably disposed at the terminal seat and can be located between a power-on position and a power-off position. The detection unit is coupled to the probing terminal, and notifies the control unit whether the probing terminal is located at the power-on position or the power-off position. The electric power modulation unit includes a transformer module, and is electrically connected to an external power. The control unit is coupled to the electric power modulation unit and the detection unit.

When the probing terminal is located at the power-on position, the control unit controls the electric power modulation unit to modulate the external power. When the probing terminal is located at the power-off position, the control unit controls the electric power modulation unit to reduce total power consumption.

The present invention further provides a power adaptation device, which is applicable to supplying power to an electronic device, and includes a terminal seat, a detection contact, an electric power modulation unit, a control unit, and a detection unit.

The detection contact is disposed at the terminal seat. The electric power modulation unit includes a transformer module, and is electrically connected to an external power. The control unit is coupled to the electric power modulation unit. The detection unit is coupled to the detection contact and the control unit, and the detection unit judges that the power adaptation device is connected to the electronic device or is not connected to the electronic device according to a voltage level of the detection contact and notifies the control unit.

The detection unit includes an optical coupling switch, the optical coupling switch is coupled to a reference voltage, the detection contact, and the control unit, and the optical coupling switch outputs a voltage difference between the voltage level of the detection contact and the reference voltage to the control unit.

When the power adaptation device is connected to the electronic device, the control unit controls the electric power modulation unit to modulate the external power to supply power and drive the electronic device. When the power adaptation device is not connected to the electronic device, the control unit controls the electric power modulation unit to reduce total power consumption.

The present invention further provides a power adaptation device, which is applicable to supplying power to an electronic device, and includes a terminal seat, a detection unit, a probing terminal, an electric power modulation unit, and a control unit.

The detection unit is fixedly sleeved over the terminal seat. The probing terminal is partially embedded in the terminal seat and movably located between a power-on position and a power-off position. The probing terminal is separated from the detection unit at the power-on position, and contacts and is conducted with the detection unit at the power-off position.

The electric power modulation unit is connected to an external power to provide a voltage source. The control unit is a control chip, and is attached to the electric power modulation unit, and the control unit is connected to the probing terminal, the detection unit, and the electric power modulation unit, so as to sense whether the probing terminal is located at the power-on position or the power-off position, and control the electric power modulation unit to supply power or stop supplying power.

When the probing terminal is located at the power-off position, the control unit controls the electric power modulation unit to turn off and stop supplying the voltage source; when the probing terminal is located at the power-on position, the control unit controls the electric power modulation unit to supply the voltage source.

The present invention further provides a power adaptation device, which is applicable to supplying power to an electronic device, and includes a terminal seat, a detection unit, an electric power modulation unit, and a control unit.

The detection unit is partially embedded and fixed in the terminal seat. The probing terminal is partially embedded in the terminal seat and movably located between a power-on position and a power-off position. The probing terminal contacts and is conducted with the detection unit at the power-on position, and is separated from the detection unit at the power-off position. The electric power modulation unit is connected to an external power to provide a voltage source. The control unit is a control chip, and is attached to the electric power modulation unit, and the control unit is connected to the probing terminal, the detection unit, and the electric power modulation unit, so as to sense whether the probing terminal is located at the power-on position or the power-off position, and control the electric power modulation unit to supply power or stop supplying power.

When the probing terminal is located at the power-off position, the control unit controls the electric power modulation unit to turn off and stop supplying the voltage source; when the probing terminal is located at the power-on position, the control unit controls the electric power modulation unit to supply the voltage source.

The present invention further provides a power supply management method, applicable to a power adaptation device. The power adaptation device includes a detection structure, a power terminal, a control unit, and an electric power modulation unit; the electric power modulation unit includes a detection unit coupled to the detection structure, the control unit is coupled to the detection unit and the power terminal, and the power adaptation device is electrically connected to an electronic device through the power terminal.

The electric power modulation unit further includes a transformer module. The detection structure is an electronic detection contact or a mechanical probing terminal.

The power supply management method of the present invention includes the following steps.

A detection result of the detection structure is read by the detection unit to judge whether the power terminal is electrically connected to the electronic device.

The detection unit notifies the control unit that the power terminal is not connected to the electronic device when it is judged that the power terminal is not connected to the electronic device.

The controller controls the electric power modulation unit to stop supplying power to the electric power modulation unit to lower a total power consumption of the electric power modulation unit.

The detection unit notifies the control unit that the power terminal is electrically connected to the electronic device when the detection unit judges that the power terminal is connected to the electronic device.

The controller controls the electric power modulation unit to modulate the external power.

The electric power modulation unit modulates an external power and supplies power to modulate the power terminal, so as to drive and modulate the electronic device.

DETAILED DESCRIPTION

Figure 1:
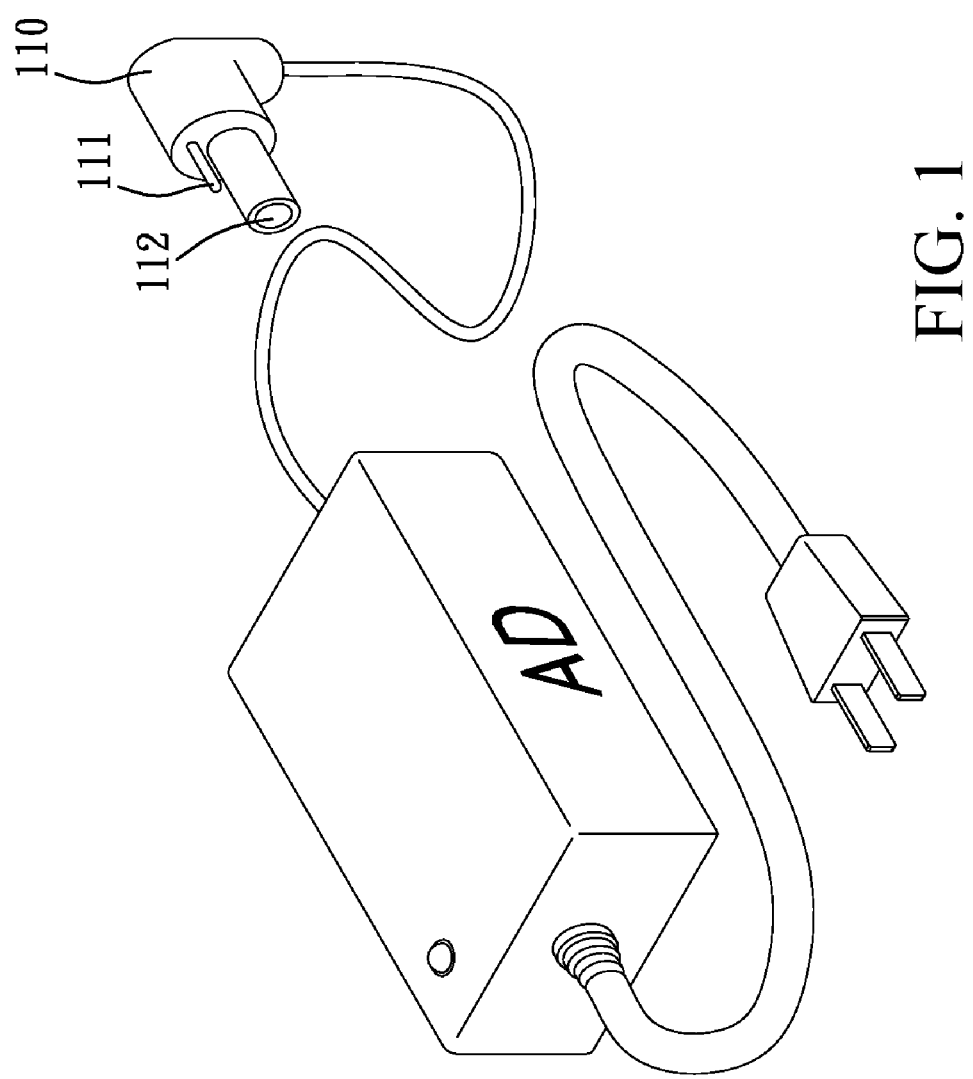
FIG. 1 is a schematic view of a first embodiment of the present invention.
Figure 2:
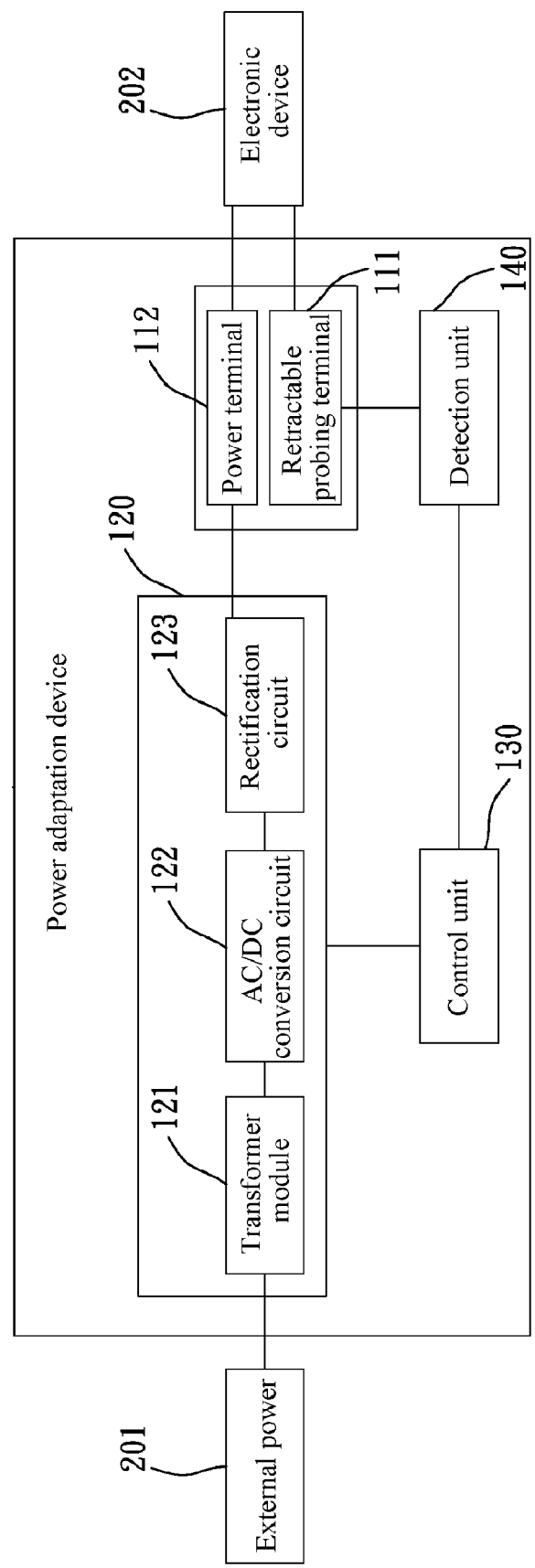
FIG. 2 is a functional block diagram of a power adaptation device in FIG. 1.

Referring to FIGS. 1 and 2, a power adaptation device of a first embodiment of the present invention is shown. In this embodiment, the power adaptation device 100 includes a terminal seat 110, a probing terminal 111, a power terminal 112, an electric power modulation unit 120, a control unit 130, and a detection unit 140.

Referring to FIG. 1, the probing terminal 111 and the power terminal 112 of the present invention are disposed on the terminal seat 110 (usually an output interface of a conventional power adapter only includes the power terminal 112 and the terminal seat 110). The probing terminal 111 is preferably in an aspect of a retractable probe (but the present invention is not thus limited), and is movably disposed on a surface of the terminal seat 110 so as to move between a power-on position and a power-off position. The power terminal 112 is disposed on the terminal seat 110.

Referring to FIG. 2, the electric power modulation unit 120 is electrically connected to an external power 201, and the electric power modulation unit 120 is coupled to the power terminal 112. In actual applications, the external power 201 can be a commercial power (such as a commercial power socket, which is generally an AC input of 110 V to 220 V in Taiwan). The electric power modulation unit 120 is used to modulate the external power 201, so as to modulate the commercial power supplied by the external power 201 into a proper output power signal. In this embodiment, the electric power modulation unit 120 preferably includes a transformer module 121, an AC/DC conversion circuit 122, and a rectification circuit 123.

The transformer module 121 and the AC/DC conversion circuit 122 modulate an AC input of 110 V to 220 V and about 1.5 A into a DC output of 19 V and 3.42 A, and after being further processed by the rectification circuit 123, the DC output is output to the power terminal 112, thereby driving an electronic device 202 (such as a computer, a television, a mobile phone, a printer or other electronic products) coupled to the power terminal 112.

The control unit 130 is coupled to the electric power modulation unit 120, and the control unit 130 is used to control operating states of various elements (such as the transformer module 121, the AC/DC conversion circuit 122, and the rectification circuit 123) in the electric power modulation unit 120. In this embodiment, the control unit 130 can selectively activate the various elements in the electric power modulation unit 120, or can also control and reduce total power consumption of the electric power modulation unit 120.

The control unit 130 can limit and enable the electric power modulation unit 120 to stop supplying power to the internal elements thereof or only supply a very low standby voltage, so as to maintain the most basic standby function of the electric power modulation unit 120 to reduce the total power consumption. In this embodiment, the power consumption of the electric power modulation unit 120 can be as low as 0.02 watts/hour.

In this embodiment, the detection unit 140 is coupled to the probing terminal 111 and the control unit 130. When the power terminal 112 of the power adaptation device 100 is inserted into a power jack (not shown) of the electronic device 202, the probing terminal 111 is pressed by the housing body of the electronic device 202 and retracts downward to the power-on position.

When the detection unit 140 detects that the probing terminal 111 is pressed and retracts to the power-on position, it can be judged that the power terminal 112 is connected to the electronic device 202. At this time, the detection unit 140 notifies the control unit 130 of controlling the electric power modulation unit 120 to modulate the external power 201, so as to supply power to the power terminal 112 for driving the electronic device 202.

When the power terminal 112 is removed from the electronic device 202, and the probing terminal 111 is recovered to the power-off position, the detection unit 140 judges that the power terminal 112 is not connected to the electronic device 202, and the detection unit 140 notifies the control unit 130 of controlling the electric power modulation unit 120 to stop supplying power to the internal elements of the electric power modulation unit 120 or only provide the very low standby voltage, so as to reduce the total power consumption of the electric power modulation unit 120.

In this embodiment, the power adaptation device 100 judges whether the power terminal 112 is connected to the electronic device 202 through a mechanical probing terminal, so as to reduce the total power consumption of the electric power modulation unit 120 when the power adaptation device 100 is not connected to an electrical load (such as the electronic device 202). However, the present invention is not limited to a load connection state detection manner using the mechanical probing terminal.

Figure 3:
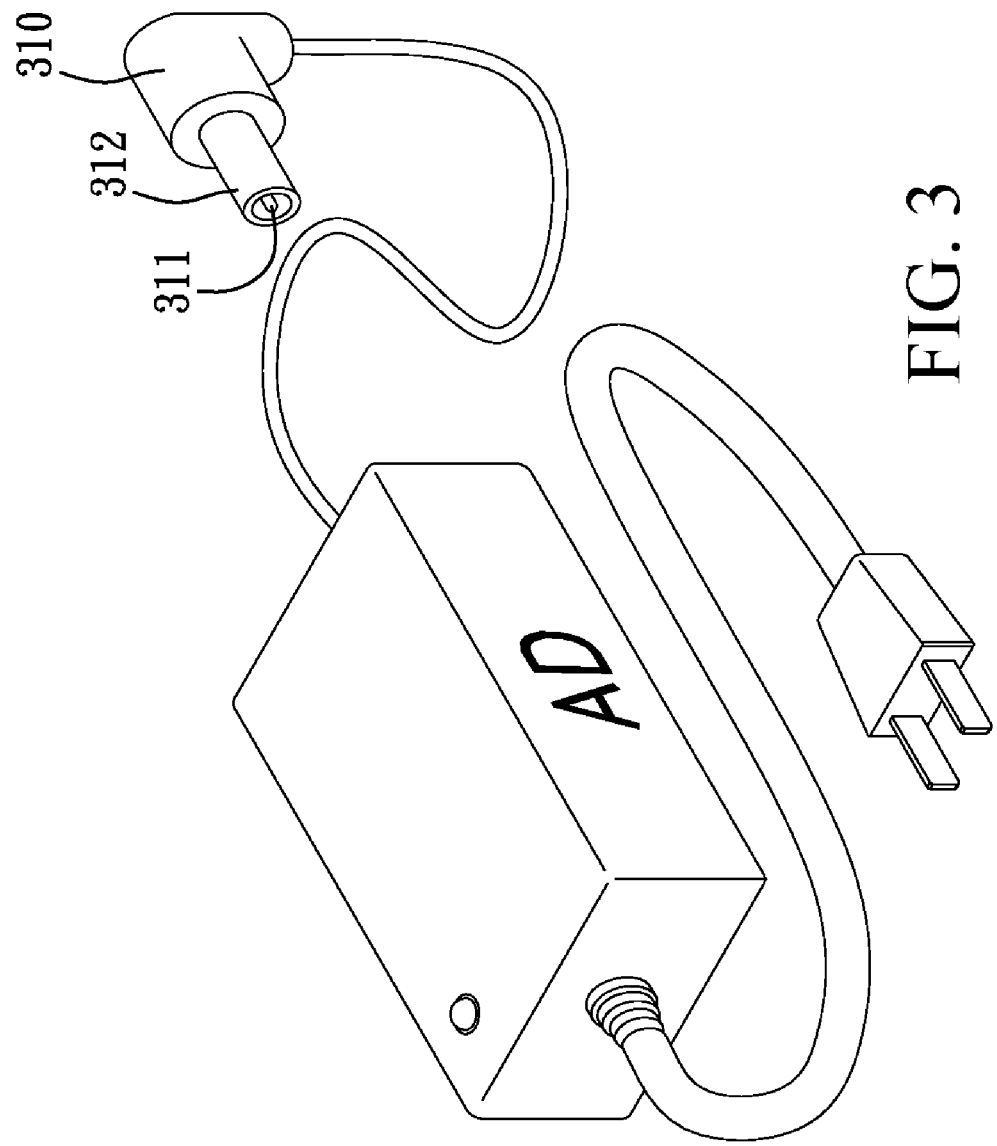
FIG. 3 is a schematic view of a second embodiment of the present invention.
Figure 4:
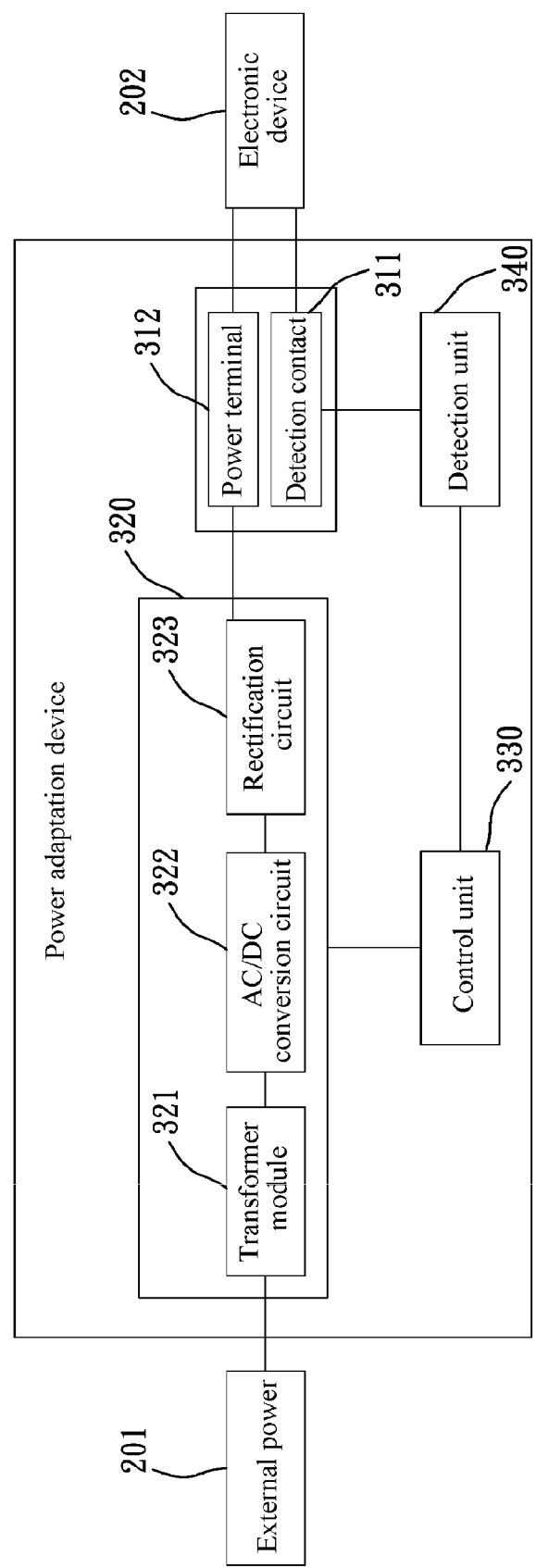
FIG. 4 is a functional block diagram of a power adaptation device in FIG. 3.

Referring to FIGS. 3 and 4, a power adaptation device of a second embodiment of the present invention is shown. In this embodiment, the power adaptation device 300 includes a terminal seat 310, a detection contact 311, a power terminal 312, an electric power modulation unit 320, a control unit 330, and a detection unit 340.

As shown in FIG. 3, in this embodiment, structure functions and connection relations of the terminal seat 310, the power terminal 312, the electric power modulation unit 320, the control unit 330, and the detection unit 340 are the same as those in the first embodiment, and are not described anymore herein. The largest difference between the power adaptation device 300 of this embodiment and the first embodiment lies in that, the detection contact 311 is disposed at the power terminal 312, and the detection contact 311 preferably can be an additional columnar pin added inside the power terminal 312. In actual applications, other ring pins can also be disposed on an outer surface of the power terminal 312, or the detection contact 311 different from a positive terminal pin and a negative terminal pin of the original power supply is formed in other manners, and the method for disposing the additional contacts is known to persons skilled in the art, and is not described anymore herein. The detection unit 340 is used to judge whether the power terminal 312 is connected to the electronic device 202 according to a voltage level of the detection contact 311.

Figure 5:
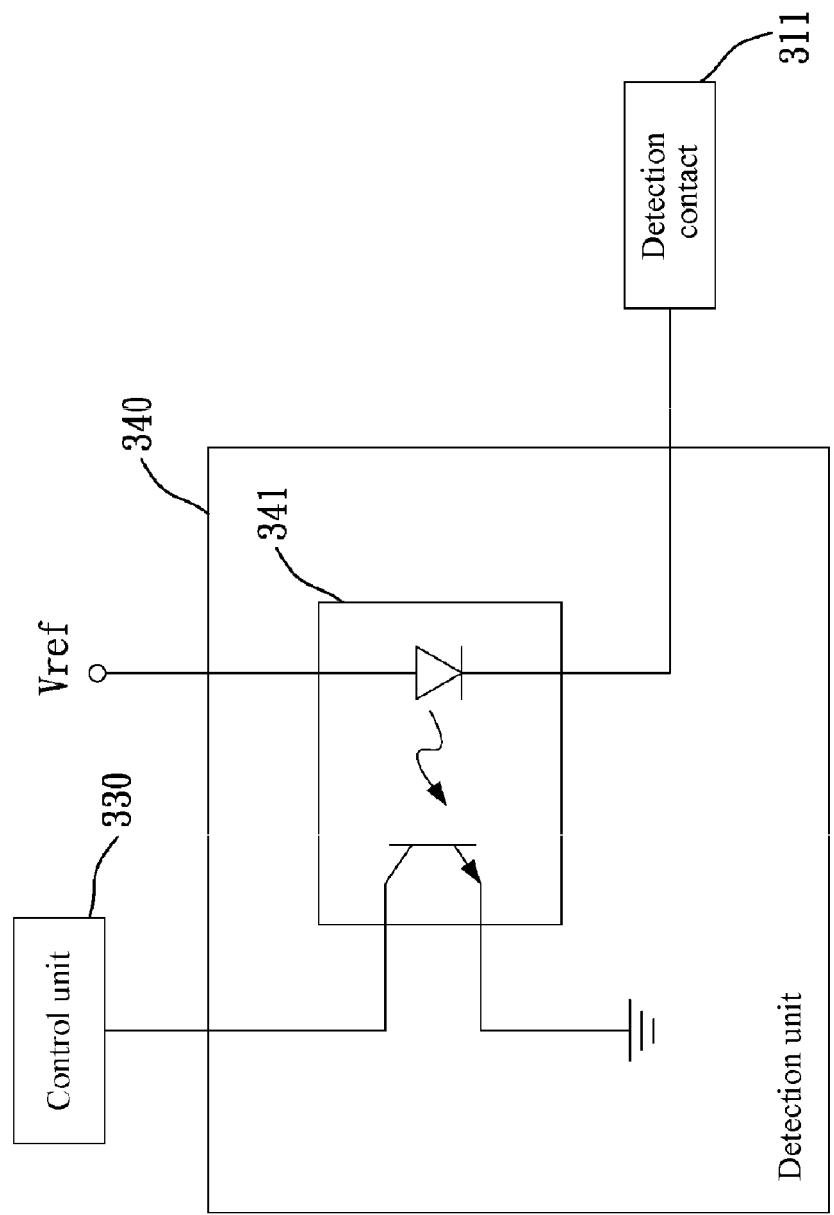
FIG. 5 is a schematic circuit diagram of a detection unit in FIG. 3.

Referring to FIGS. 4 and 5, in this embodiment, the detection unit 340 preferably includes an optical coupling switch 341, and the optical coupling switch 341 includes two input ends, in which one input end is coupled to a reference voltage Vref, and the other input end is coupled to the detection contact 311.

The optical coupling switch 341 judges and generates a judgment result signal corresponding to a connection state between the power terminal 112 and the electronic device 202 according to a voltage difference between the voltage level of the detection contact 311 and the reference voltage Vref, and the detection unit 340 sends the judgment result signal to the control unit 330, so as to notify the control unit 330 of performing subsequent operations.

For example, the reference voltage Vref can be fixed as a high level system voltage (such as 5 V). When the power terminal 312 is not connected to the electronic device 202, the detection contact 311 is idle at this time. However, the voltage difference between the voltage level of the detection contact 311 and the reference voltage Vref is floating, and the optical coupling switch 341 is inactive at this time. When the power terminal 312 is connected to the electronic device 202, the electronic device 202 can enable the detection contact 311 to be coupled to a ground voltage (0 V). Thereby, the voltage level of the detection contact 311 is reduced, the voltage difference between the voltage level of the detection contact 311 and the reference voltage Vref (5 V) is +5 volts, and this voltage difference activates the optical coupling switch 341, thereby generating the judgment result signal, so as to notify the control unit 330. In this way, the control unit 330 controls the electric power modulation unit 320 to reduce the total power consumption of the electric power modulation unit 320.

Referring to FIGS. 6 to 9, a power adaptation device of a third embodiment of the present invention is shown. In this embodiment, the power adaptation device 100 includes a terminal seat 110, a mechanical probing terminal 111, a power terminal 112, a sleeve 113, an electric power modulation unit 120, a control unit 130, and a detection unit 140.

The probing terminal 111 is preferably a metallic contact, the probing terminal 111 and the power terminal 112 are disposed at the terminal seat 110, and the terminal seat 110 is movably disposed in the sleeve 113. The detection unit 140 is preferably a metallic contact, is coupled to the control unit 130, and is disposed at an inner wall of the sleeve 113, so that relative to the detection unit 140, the probing terminal 111 is movably located between a power-on position and a power-off position.

Figure 6:
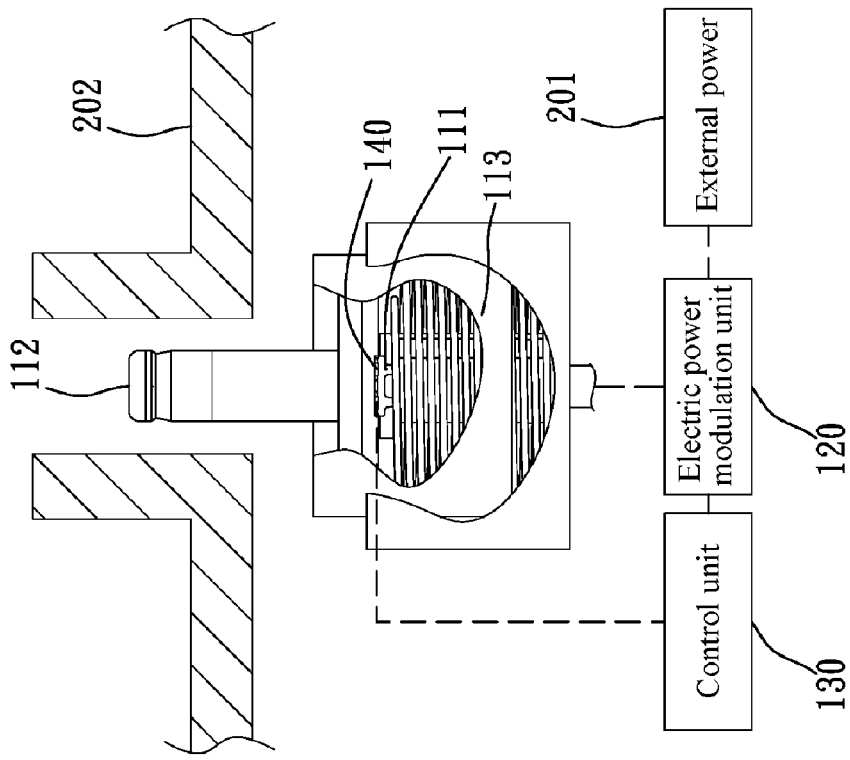
FIG. 6 is a schematic view of a third embodiment of the present invention (when the probing terminal is located at a power-on position)
Figure 8:
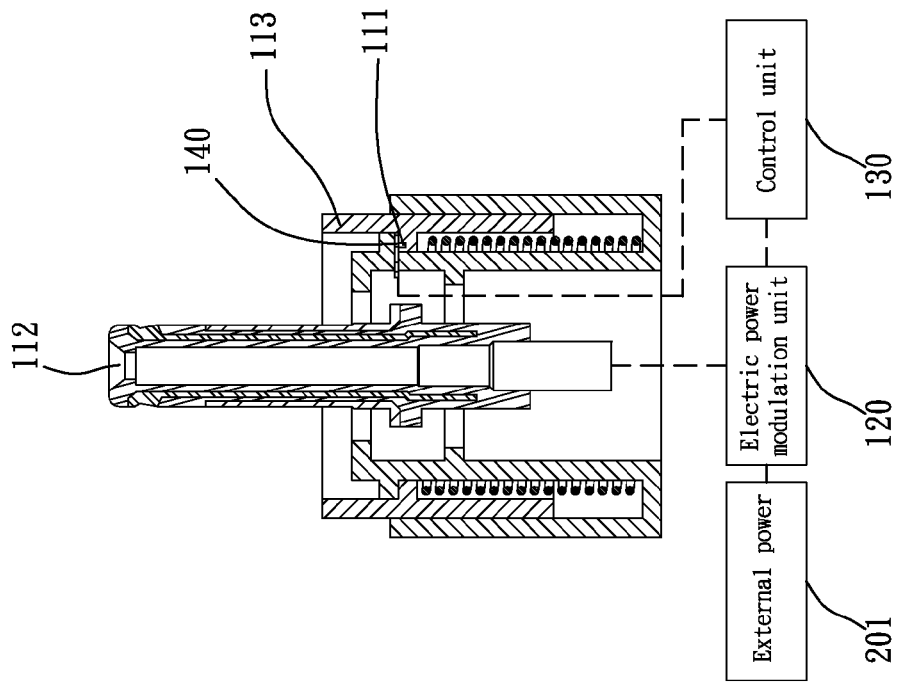
FIG. 8 is a sectional view of the third embodiment of the present invention (when the probing terminal is located at a power-on position)

Referring to FIGS. 6 and 8, when the power terminal 112 of the power adaptation device 100 is inserted into a power jack of the electronic device 202, the sleeve 113 is pressed by the housing body of the electronic device 202 and retracts downward, and the probing terminal 111 is separated from the detection unit 140 and is located at the power-on position.

When the detection unit 140 detects that the probing terminal 111 is located at the power-on position, it can be judged that the power terminal 112 is connected to the electronic device 202. At this time, the detection unit 140 notifies the control unit 130 of controlling the electric power modulation unit 120 to modulate the external power 201, so as to supply power to the power terminal 112 for driving the electronic device 202.

Figure 7:
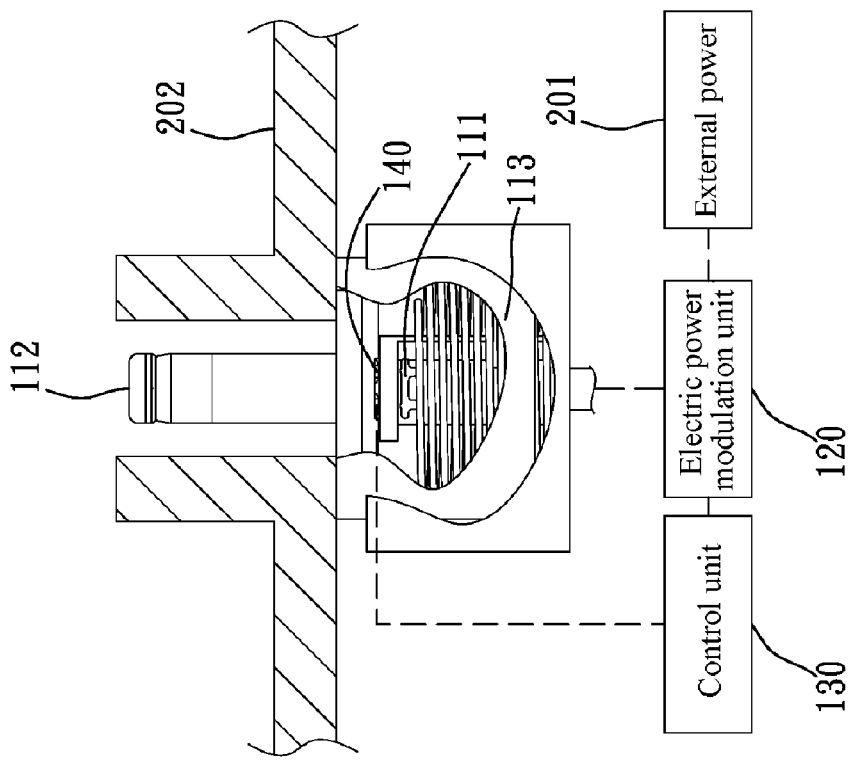
FIG. 7 is a schematic view of the third embodiment of the present invention (when the probing terminal is located at a power-off position)
Figure 9:
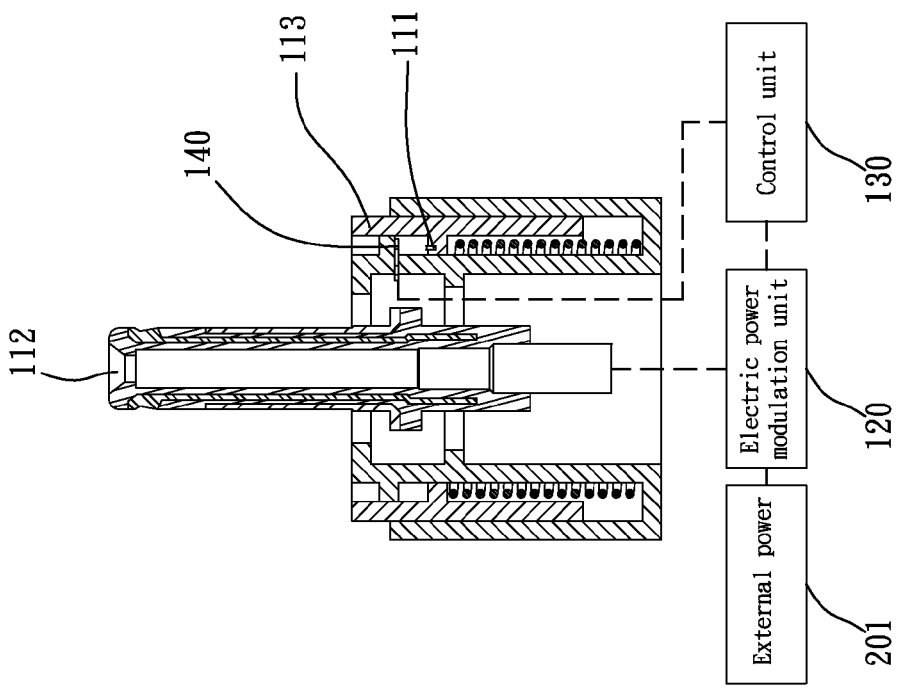
FIG. 9 is a sectional view of the third embodiment of the present invention (when the probing terminal is located at a power-off position)

Referring to FIGS. 7 and 9, when the power terminal 112 is removed from the electronic device 202, and the probing terminal 111 is recovered to the power-off position, contacts and is conducted with the detection unit 140, the detection unit 140 judges that the power terminal 112 is not connected to the electronic device 202, and the detection unit 140 notifies the control unit 130 of controlling the electric power modulation unit 120 to stop supplying power to the internal elements of the electric power modulation unit 120 or only provide the very low standby voltage, so as to reduce the total power consumption of the electric power modulation unit 120.

Referring to FIGS. 10 to 13, a power adaptation device of a fourth embodiment of the present invention is shown. In this embodiment, the power adaptation device 100 includes a terminal seat 110, a mechanical probing terminal 111, a power terminal 112, a sleeve 113, an electric power modulation unit 120, a control unit 130, and a detection unit 140.

The probing terminal 111 is preferably a plastic probe, the probing terminal 111 and the power terminal 112 are disposed at the terminal seat 110, and the terminal seat 110 is movably disposed in the sleeve 113. The detection unit 140 is preferably a pair of metallic clip-shaped terminals, is coupled to the control unit 130, and is disposed at an inner wall of the sleeve 113, so that relative to the detection unit 140, the probing terminal 111 is movably located between a power-on position and a power-off position.

Figure 10:
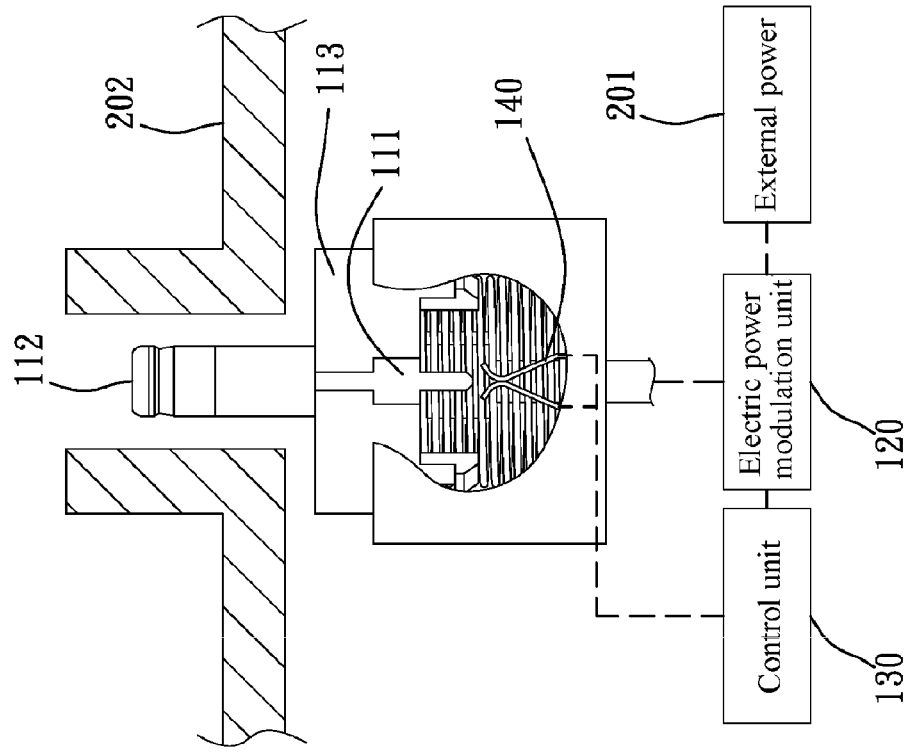
FIG. 10 is a schematic view of a fourth embodiment of the present invention (when the probing terminal is located at a power-on position)
Figure 12:
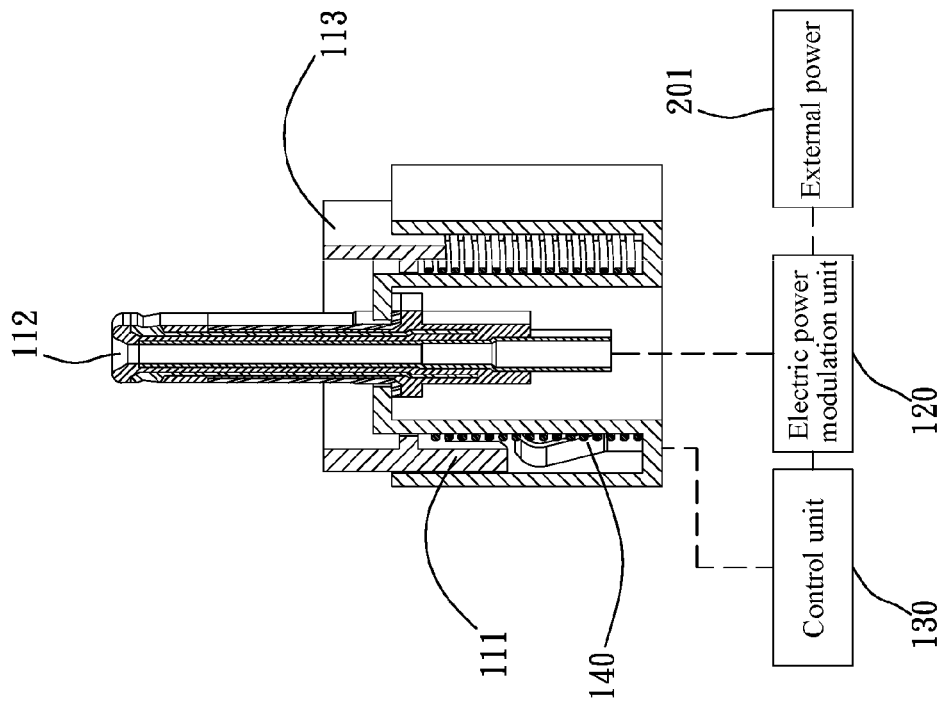
FIG. 12 is a sectional view of the fourth embodiment of the present invention (when the probing terminal is located at a power-on position)

Referring to FIGS. 10 and 12, when the power terminal 112 of the power adaptation device 100 is inserted into a power jack of the electronic device 202, the sleeve 113 is pressed by the housing body of the electronic device 202 and retracts downward, and the probing terminal 111 is inserted into the detection unit 140 and is located at the power-on position, so that two clip-shaped terminals of the detection unit 140 are separated and are not conducted.

When the detection unit 140 detects that the probing terminal 111 is located at the power-on position, it can be judged that the power terminal 112 is connected to the electronic device 202. At this time, the detection unit 140 notifies the control unit 130 of controlling the electric power modulation unit 120 to modulate the external power 201, so as to supply power to the power terminal 112 for driving the electronic device 202.

Figure 11:
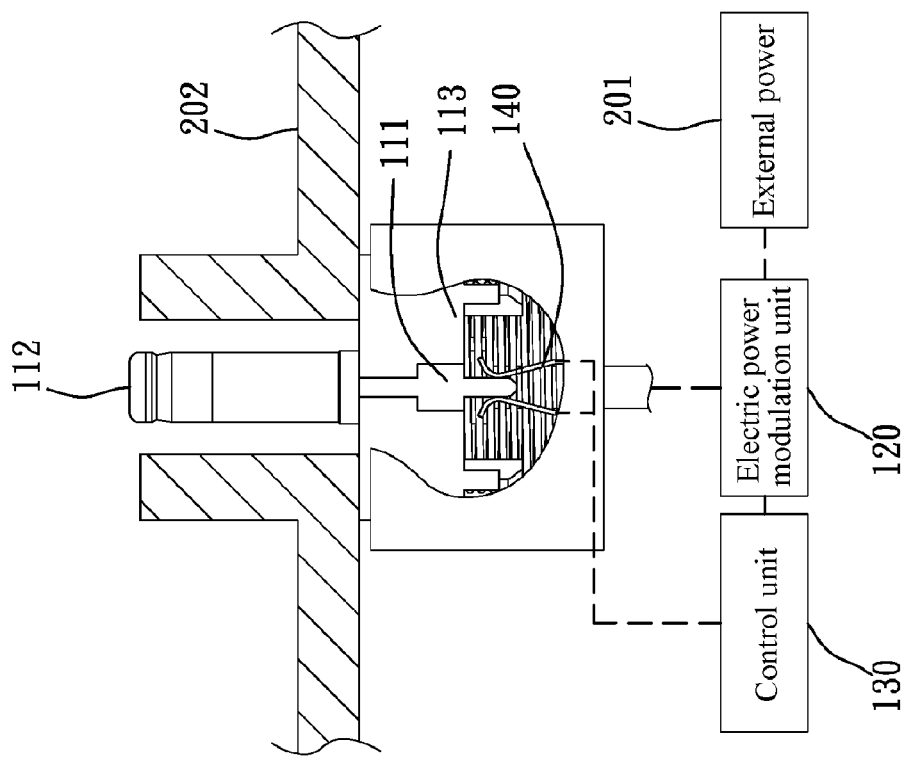
FIG. 11 is a schematic view of the fourth embodiment of the present invention (when the probing terminal is located at a power-off position)
Figure 13:
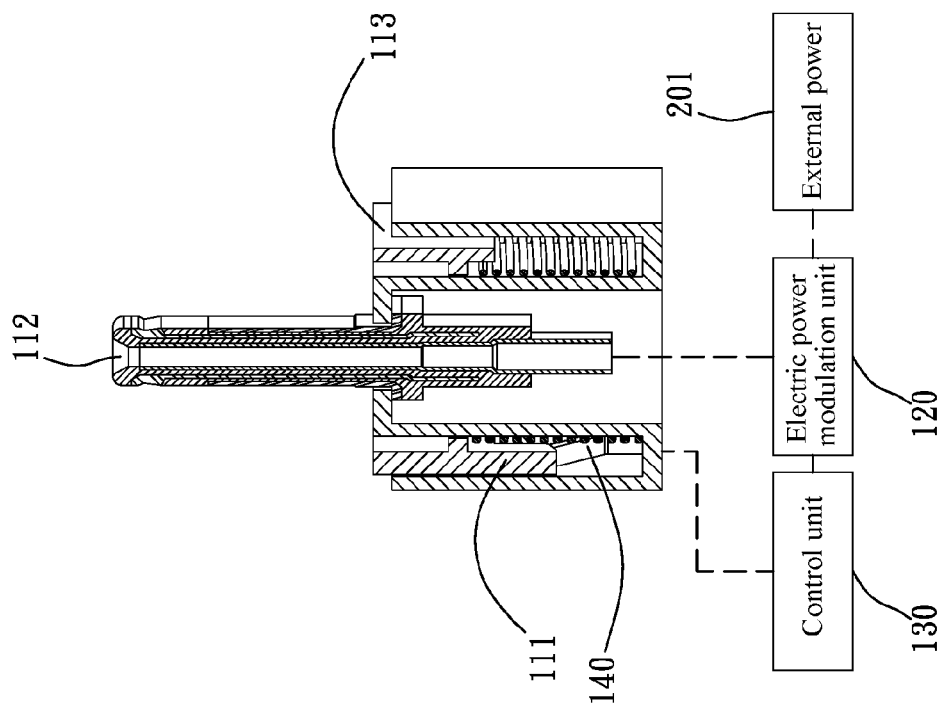
FIG. 13 is a sectional view of the fourth embodiment of the present invention (when the probing terminal is located at a power-off position)

Referring to FIGS. 11 and 13, when the power terminal 112 is removed from the electronic device 202, and the probing terminal 111 is recovered to the power-off position, two clip-shaped terminals of the detection unit 140 contact each other and are conducted, the detection unit 140 judges that the power terminal 112 is not connected to the electronic device 202, and the detection unit 140 notifies the control unit 130 of controlling the electric power modulation unit 120 to stop supplying power to the internal elements of the electric power modulation unit 120 or only provide the very low standby voltage, so as to reduce the total power consumption of the electric power modulation unit 120.

Figure 14:
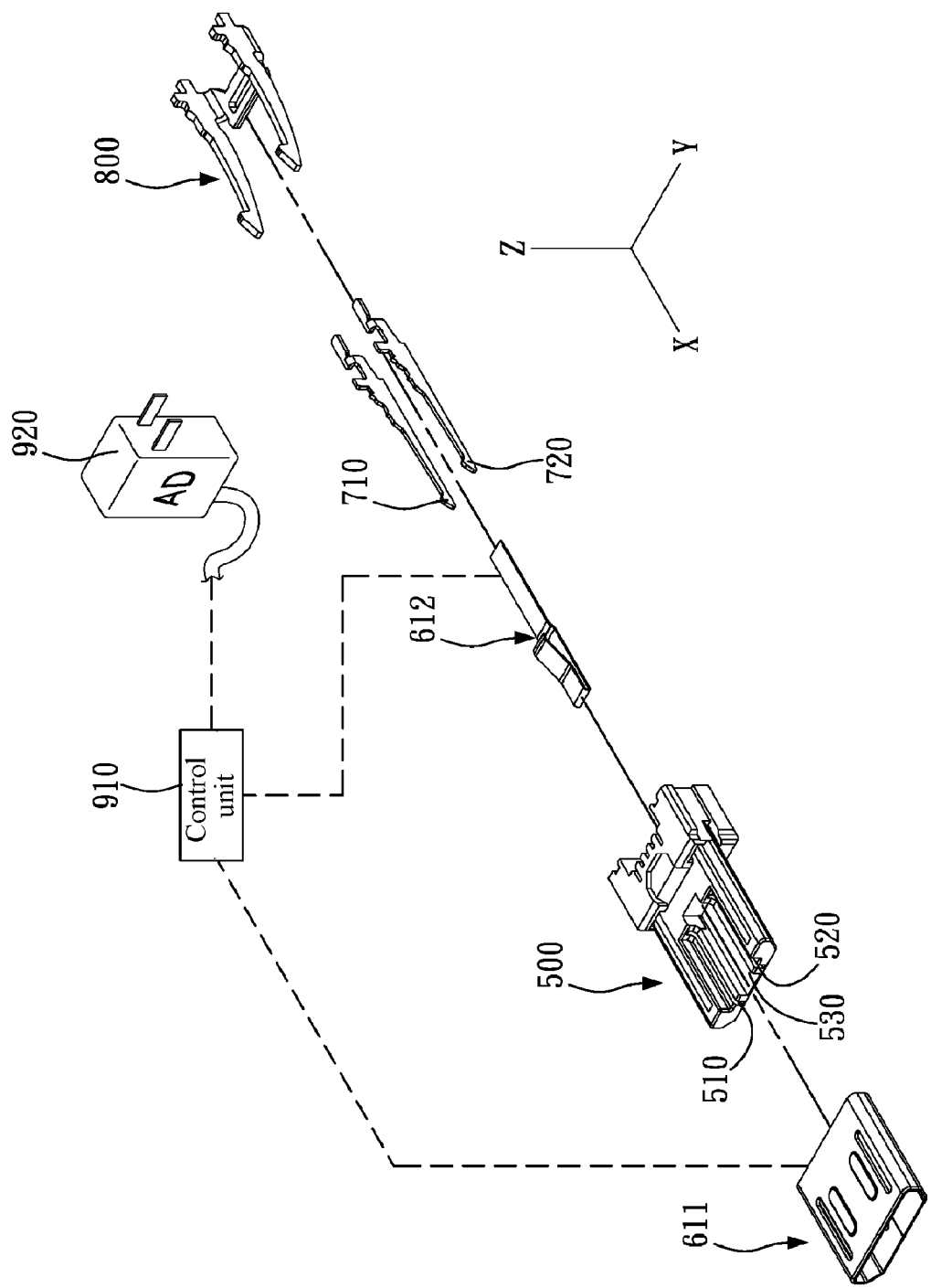
FIG. 14 is an exploded view of a fifth embodiment of the present invention.
Figure 15:
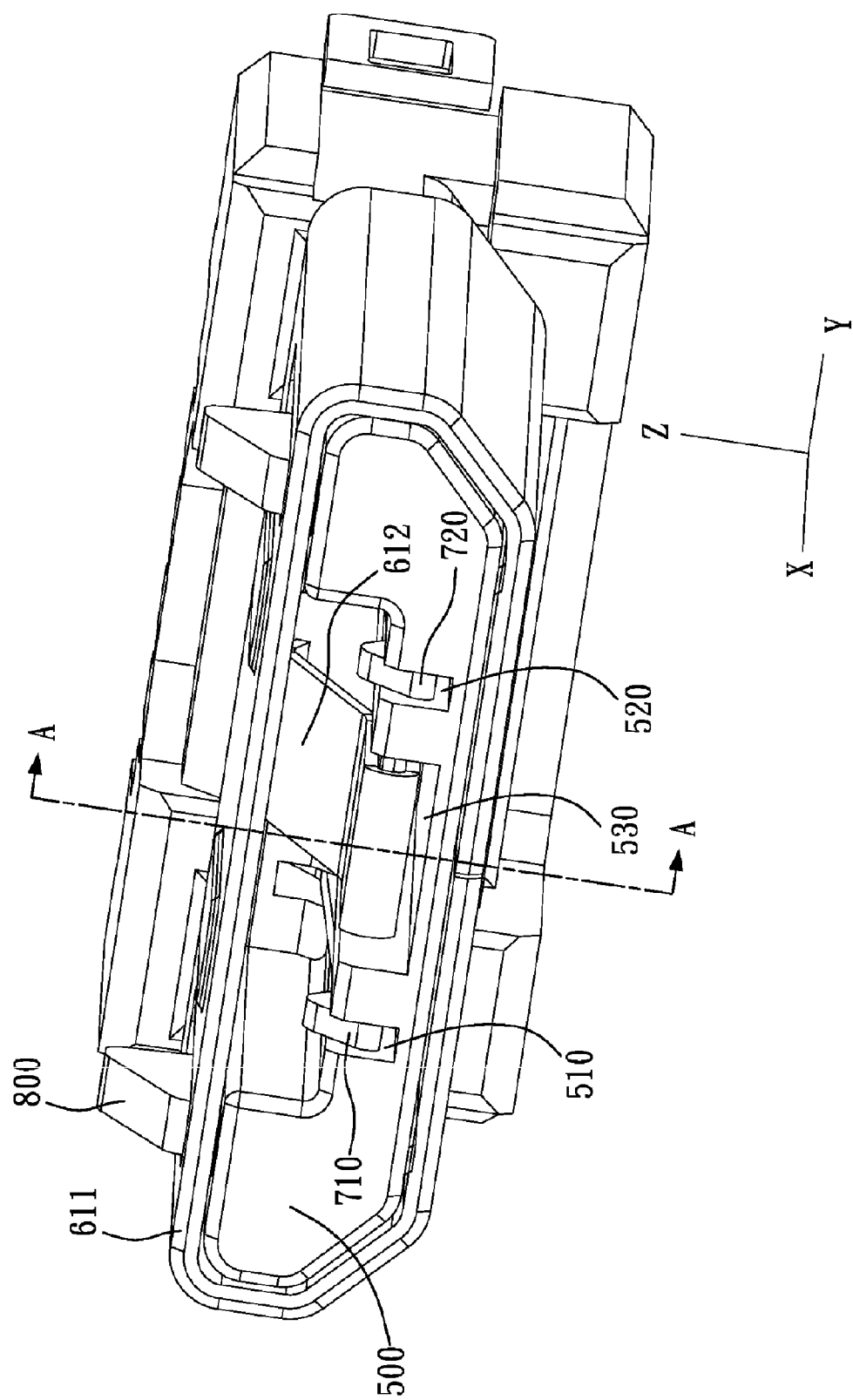
FIG. 15 is a schematic view of the fifth embodiment of the present invention.

Referring to FIGS. 14 and 15, a power adaptation device of a fifth embodiment of the present invention is shown. The power adaptation device of this embodiment is applicable to being plugged into an external transmission interface on an electronic device 202, and this embodiment preferably includes a terminal seat 500, a detection unit element 611, a probing terminal 612, two power terminals 710/720, a catch 800, and a control unit 910.

The terminal seat 500 is a base made of plastic, and is preferably disposed with three terminal slots 510/520/530; the detection unit element 611 is in a shape of a tube with two open ends, is formed by bending a metallic sheet, and is circumferentially sleeved over the terminal seat 500, so that the detection unit element 611 is fixed at the terminal seat 500.

The probing terminal 612 is a bent metallic sheet in a long strip shape, and is preferably formed by embedded injection molding (the present invention is not limited thereto) so that a part of the probing terminal 612 is fixedly embedded in the terminal seat 500, and the other part is half accommodated in the terminal slot 530, so as to enable the probing terminal 612 to elastically move and be located between the power-on position and the power-off position. In this embodiment, the probing terminal 612 is partially fixed and embedded in the terminal seat 500 and is inactive, the part accommodated in the terminal slot 530 can be elastically active and form an elastic arm. Preferably, the elastic arm of the probing terminal 612 is bent reversely, and the bending point is accommodated in the terminal slot 530.

The fixed detection unit element 611 and the elastically active probing terminal 612 form a group of detection loops, and when the probing terminal 612 is located at the power-off position, the probing terminal 612 contacts and is conducted with the detection unit element 611; when the probing terminal is located at the power-on position, the probing terminal is separated from and not conducted with the detection unit element.

The power terminals 710/720 are metallic sheets in a long strip shape for providing a voltage source. In this embodiment, the two power terminals 710/720 and the probing terminal 612 are disposed in parallel, and the two power terminals 710/720 are disposed at two sides of the probing terminal 612 respectively. One power terminal 710 is partially embedded in the terminal seat 500, and a part thereof is accommodated in the terminal slot 510; the other power terminal 720 is partially embedded in the terminal seat 500, and a part thereof is accommodated in the terminal slot 520.

The control unit 910 can be a control chip attached to an electric power modulation unit 920, and connected to the detection unit element 611, the probing terminal 612, and the electric power modulation unit 920, and the electric power modulation unit 920 is connected to an external power and can provide a predetermined voltage (such as 5 V) to the power terminals 710/720. The control unit 910 is used to sense whether the probing terminal 612 is located at the power-on position or the power-off position, and control the electric power modulation unit 920 to supply power to the power terminals 710/720 or control and reduce the total power consumption of the electric power modulation unit according to a sensing result.

The catch 800 is disposed at the terminal seat 500, and when the power adaptation device of the present invention is connected to a Micro USB external transmission interface, the catch 800 is used to lock the power adaptation device of the present invention and the Micro USB external transmission interface.

Figure 16:
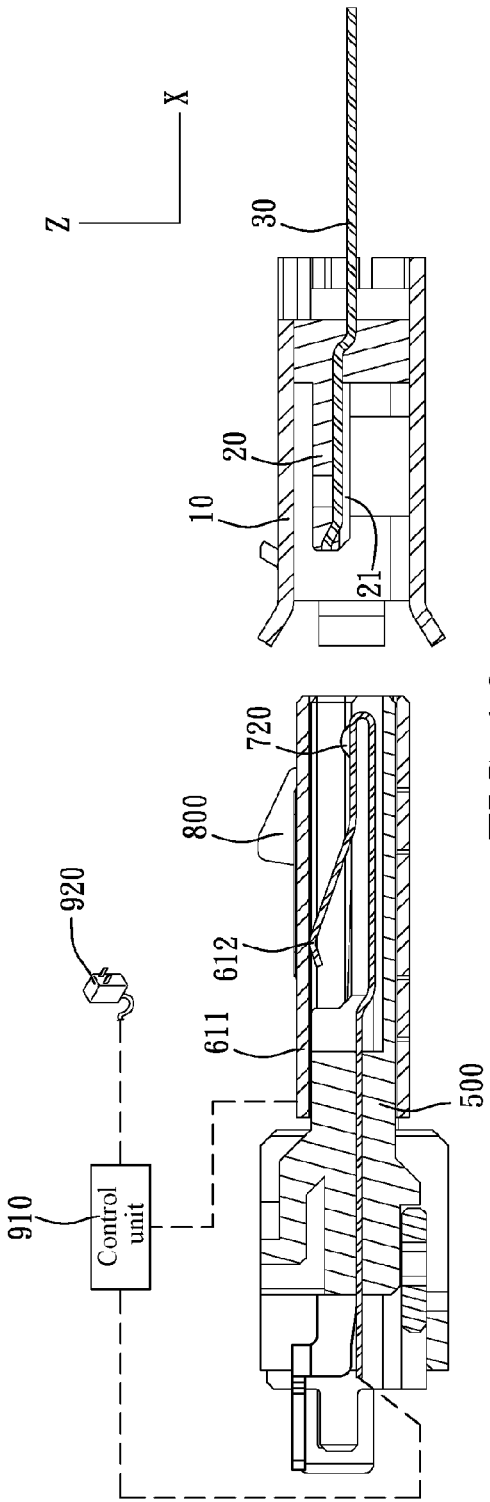
FIG. 16 is a sectional view along Line AA in FIG. 15 (when the probing terminal is located at a power-off position)
Figure 17:
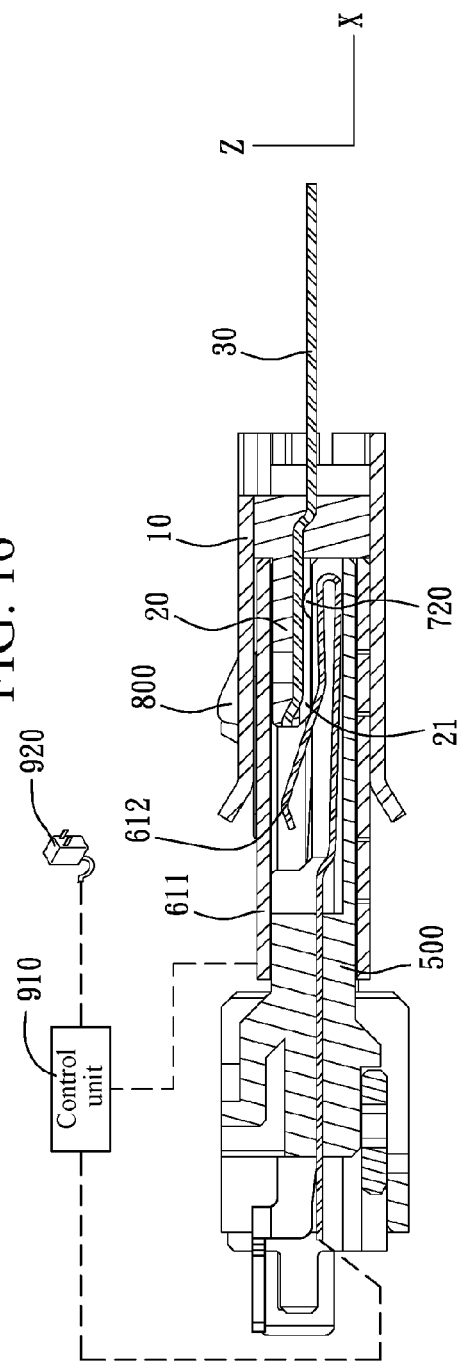
FIG. 17 is a sectional view along Line AA in FIG. 15 (when the probing terminal is located at a power-on position)

Referring to FIGS. 16 and 17, the power adaptation device of the present invention is applicable to being plugged into a Micro USB external transmission interface, and the Micro USB external transmission interface has a plurality of external terminals 30, a part of which is embedded in a tongue portion 20. An iron housing 10 circumferentially covers the tongue portion 20, and when being plugged, the catch 800 is locked at the iron housing 10.

Referring to FIGS. 10 and 11, when the Micro USB external transmission interface is not inserted, the probing terminal 612 is located at the power-off position, contacts the detection unit element 611 and is switched into conduction. When the control unit 910 senses that the detection unit element 611 and the probing terminal 612 are conducted, the control unit 910 controls and reduces the total power consumption of the electric power modulation unit 920.

Referring to FIGS. 15 and 17, when the Micro USB external transmission interface is inserted, the tongue portion 20 of the Micro USB external transmission interface moves along an outer edge of the terminal slot 530 to press the probing terminal 612 to move into the terminal slot 530 to the power-on position, so that the detection unit element 611 and the probing terminal 612 are separated and are not conducted. When the control unit 910 senses that the detection unit element 621 and the probing terminal 622 are not conducted, the control unit 910 controls the electric power modulation unit 920 to provide a voltage source.

Because a surface of the tongue portion 20 of the Micro USB external transmission interface is disposed with several spacers 21, and a part of the external terminal 30 of the Micro USB external transmission interface exposed out of the tongue portion 20 is submerged between two spacers 21, when the Micro USB external transmission interface is inserted, the spacers 21 can prevent the external terminal 30 of the Micro USB external transmission interface from contacting the probing terminal 612, so that only the power terminals 710/720 can contact the external terminal 30 of the Micro USB external transmission interface.

Figure 18:
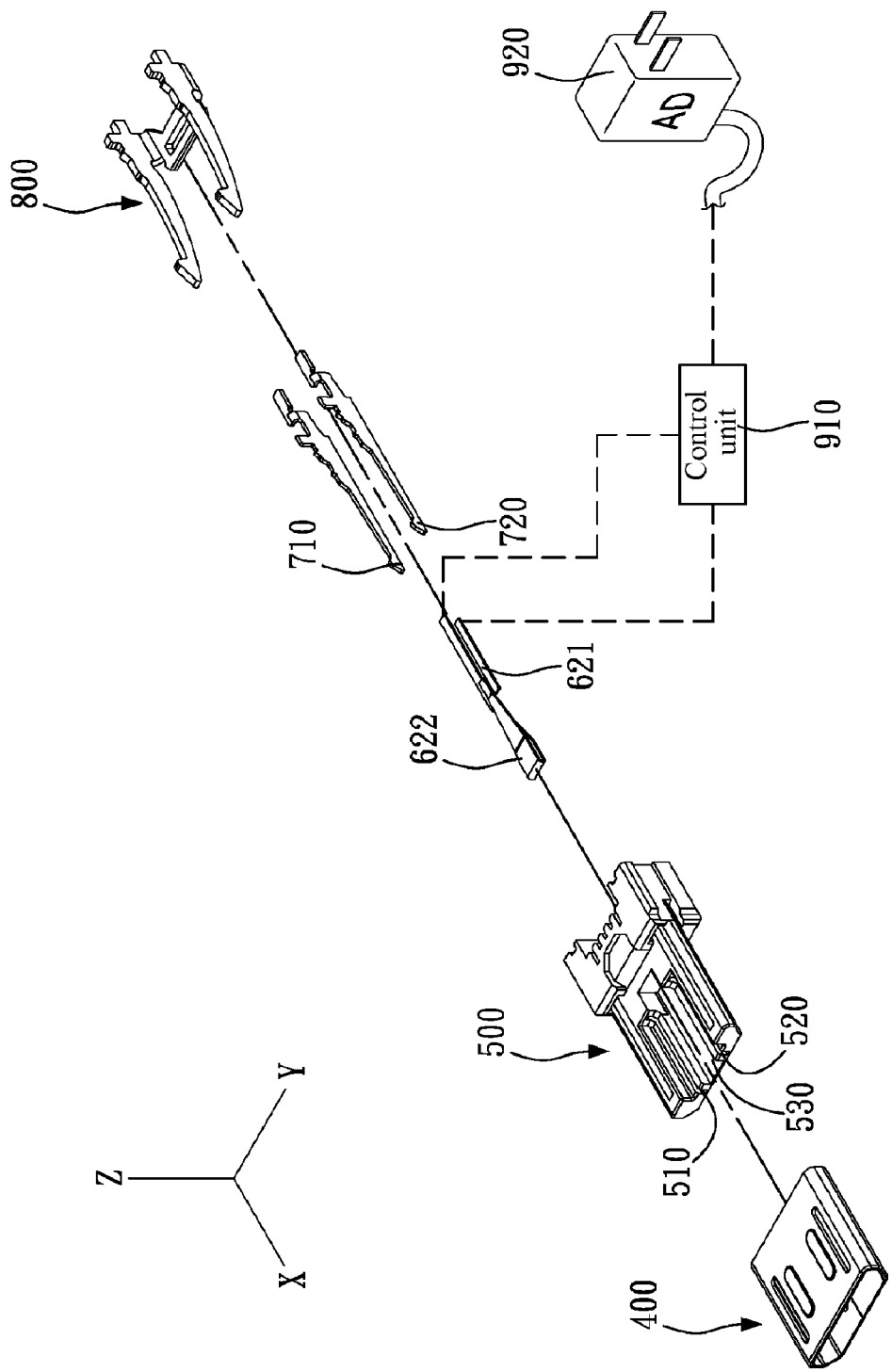
FIG. 18 is an exploded view of a sixth embodiment of the present invention.
Figure 19:
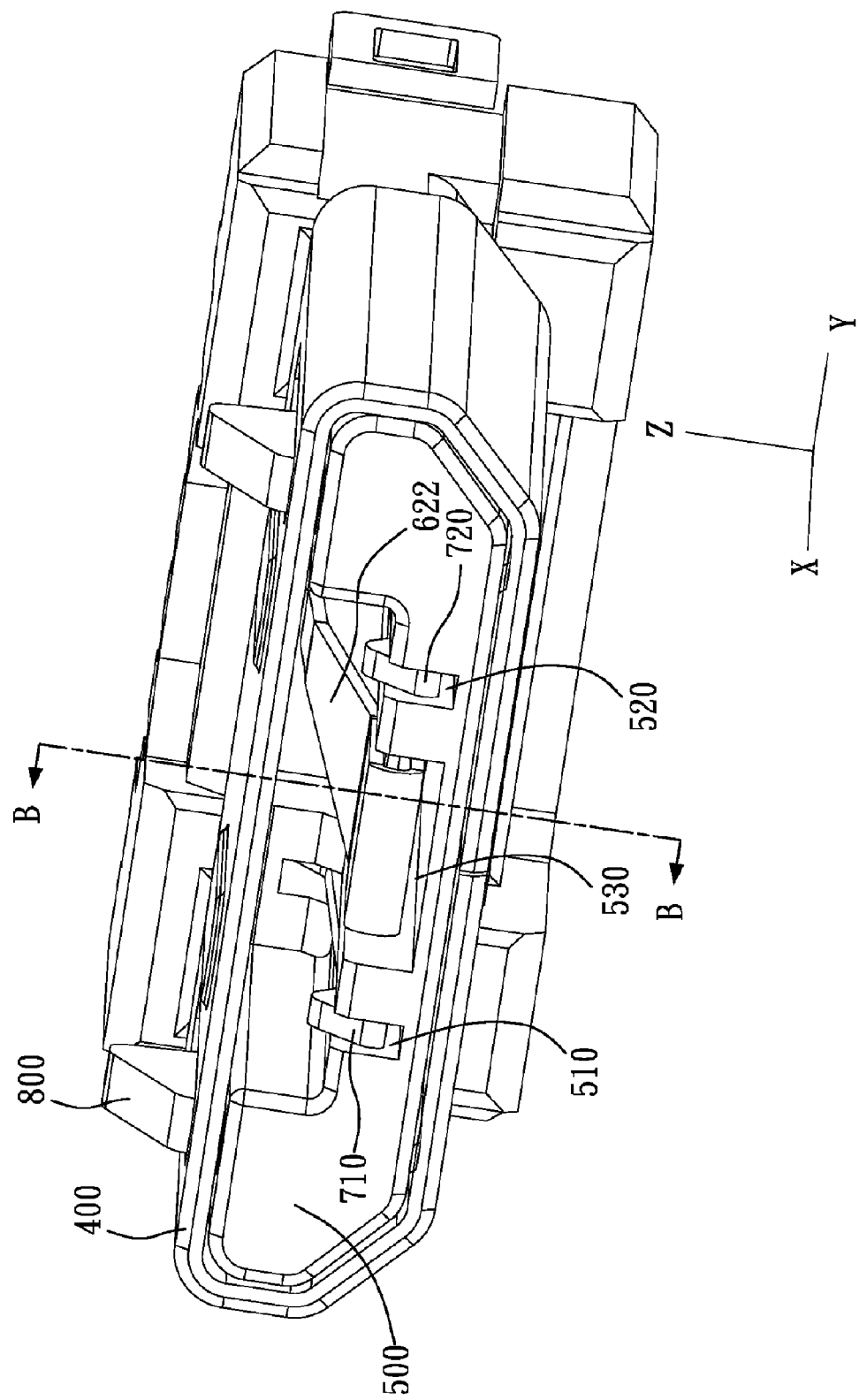
FIG. 19 is a schematic view of the sixth embodiment of the present invention.

Referring to FIGS. 18 and 19, a power adaptation device of a sixth embodiment of the present invention is shown. The power adaptation device of this embodiment preferably includes a housing 400, a terminal seat 500, a detection unit element 621, a probing terminal 622, two power terminals 710/720, a catch 800, and a control unit 910.

The terminal seat 500 is a base made of plastic, and is preferably disposed with three terminal slots 510/520/530; the housing 400 is in a shape of a tube with two open ends, is formed by bending a metallic sheet, and is circumferentially sleeved over the terminal seat 500.

The detection unit element 621 is a bent metallic sheet in a long strip shape, and is preferably formed by embedded injection molding (the present invention is not limited thereto) so that a part thereof is fixedly embedded in the terminal seat 500, and the other part thereof is accommodated in the terminal slot 530.

The probing terminal 622 is a bent metallic sheet in a long strip shape, and is preferably formed by embedded injection molding (the present invention is not limited thereto) so that a part of the probing terminal 622 is fixedly embedded in the terminal seat 500, and the other part is half accommodated in the terminal slot 530, so as to enable the probing terminal 622 to elastically move and be located between the power-on position and the power-off position. In this embodiment, an intermediate part of the probing terminal 622 is fixed and embedded in the terminal seat 500 and is inactive, a part accommodated in the terminal slot 530 can be elastically active and form an elastic arm. Preferably, the elastic arm of the probing terminal 622 is bent reversely, and the bending point is accommodated in the terminal slot 530.

The fixed detection unit element 621 and the elastically active probing terminal 622 form a group of detection loops, and when the probing terminal 612 is located at the power-on position, the probing terminal 622 contacts and is conducted with the detection unit element 621; and when the probing terminal 622 is located at the power-off position, the probing terminal 622 and the detection unit element 322 are separated and are not conducted.

The power terminals 710/720 are metallic sheets in a long strip shape for providing a voltage source. In this embodiment, the two power terminals 710/720 and the probing terminal 622 are disposed in parallel, and the two power terminals 710/720 are disposed at two sides of the probing terminal 622 respectively. One power terminal 710 is partially embedded in the terminal seat 500, and a part thereof is accommodated in the terminal slot 510; the other power terminal 720 is partially embedded in the terminal seat 500, and a part thereof is accommodated in the terminal slot 520.

The control unit 910 can be a control chip attached to an electric power modulation unit 920, and connected to the detection unit element 621, the probing terminal 622, and the electric power modulation unit 920, and the electric power modulation unit 920 is connected to a voltage source and can provide a predetermined voltage (such as 5 V). The control unit 910 is used to sense whether the probing terminal 622 is located at the power-on position or the power-off position, and control the electric power modulation unit 920 to supply power or control and reduce the total power consumption of the electric power modulation unit 920 according to a sensing result.

The catch 800 is disposed at the terminal seat 500, and when the power adaptation device of the present invention is connected to a Micro USB external transmission interface, the catch 800 is used to lock the power adaptation device of the present invention and the Micro USB external transmission interface.

Figure 20:
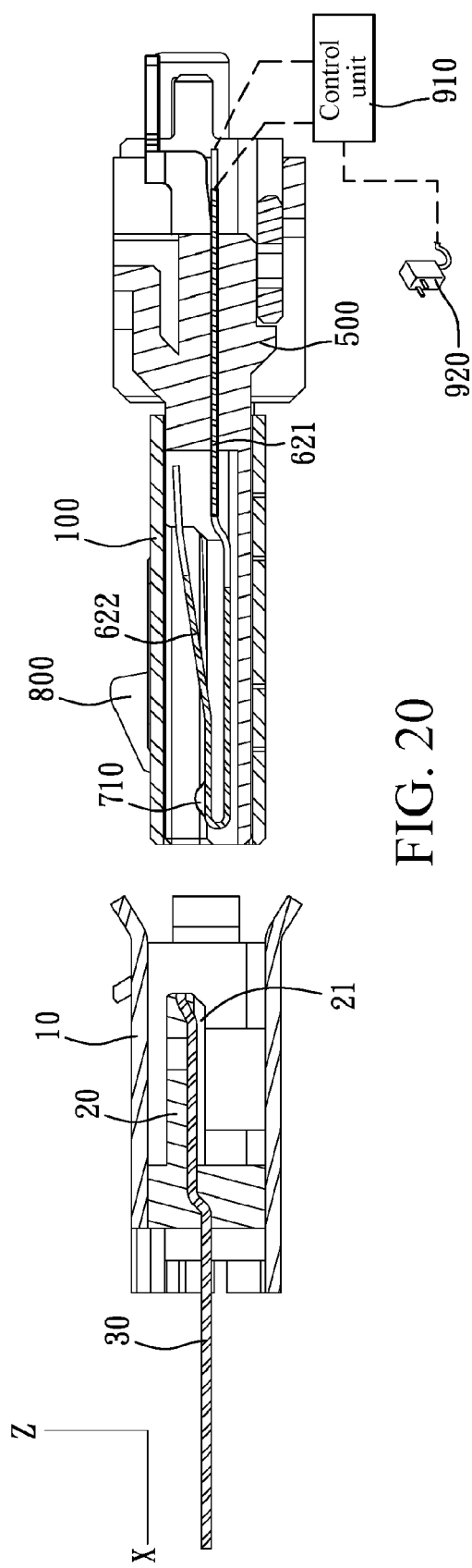
FIG. 20 is a sectional view along Line BB in FIG. 19 (when the probing terminal is located at a power-off position)
Figure 21:
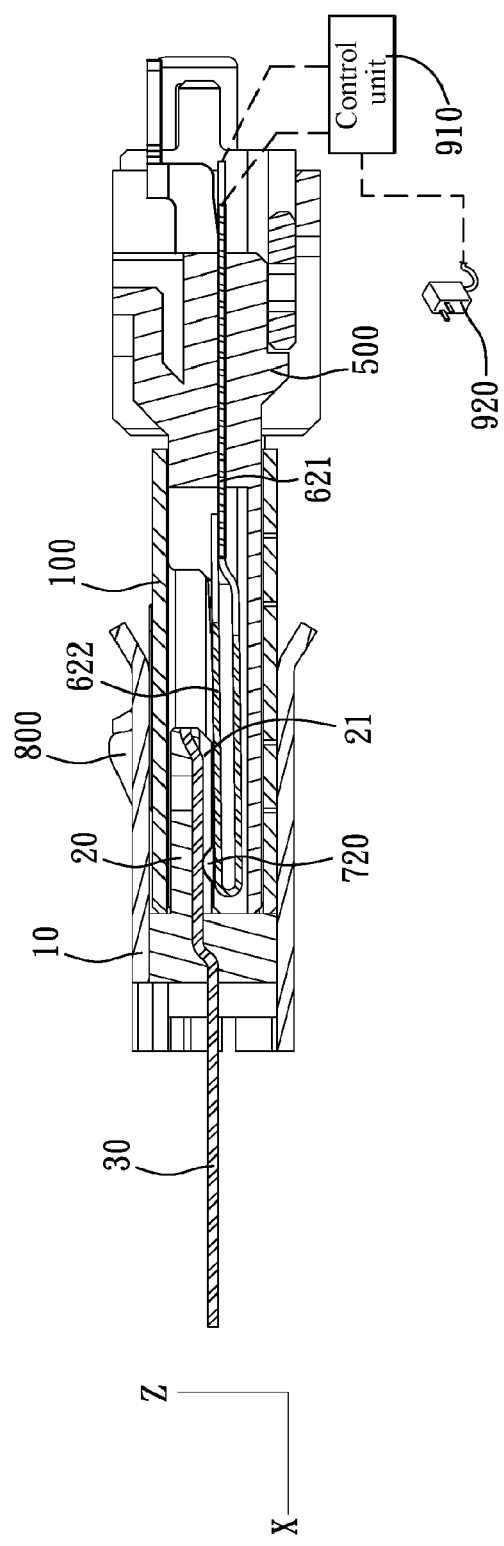
FIG. 21 is a sectional view along Line BB in FIG. 19 (when the probing terminal is located at a power-on position)

Referring to FIGS. 20 and 21, the power adaptation device of the present invention is applicable to being plugged into a Micro USB external transmission interface, and the Micro USB external transmission interface has a plurality of external terminals 30, a part of which is embedded in a tongue portion 20. An iron housing 10 circumferentially covers the tongue portion 20, and when being plugged, the catch 800 is locked at the iron housing 10.

Referring to FIGS. 19 and 20, when the Micro USB external transmission interface is not inserted, the probing terminal 622 is located at the power-off position, the detection unit element 621 and the probing terminal 622 are separated and are not conducted, and the control unit 910 controls and reduces the total power consumption of the electric power modulation unit 920.

Referring to FIGS. 19 and 21, when the Micro USB external transmission interface is inserted, the tongue portion 20 of the Micro USB external transmission interface moves along an outer edge of the terminal slot 530 to press the probing terminal 622 to move into the terminal slot 530 to the power-on position, so that the probing terminal 622 and the detection unit element 621 contact each other and are conducted. When the control unit 910 senses that the detection unit element 621 and the probing terminal 622 are conducted, the control unit 910 controls the electric power modulation unit 920 to provide a voltage source. Because a surface of the tongue portion 20 of the Micro USB external transmission interface is disposed with several spacers 21, and a part of the external terminal 30 of the Micro USB external transmission interface exposed out of the tongue portion 20 is submerged between two spacers 21, when the Micro USB external transmission interface is inserted, the spacers 21 can prevent the external terminal 30 of the Micro USB external transmission interface from contacting the probing terminal 622, so that only the power terminals 710/720 can contact the external terminal 30 of the Micro USB external transmission interface.

In addition, the present invention also provides a power supply management method, applicable to a power adaptation device. The power adaptation device includes a detection structure (such as the electronic detection contact in the first embodiment, or the mechanical probing terminal in the second embodiment), a power terminal, a control unit, and an electric power modulation unit.

The control unit is coupled to the detection structure, the power terminal, and the electric power modulation unit, and the power adaptation device can be electrically connected to an electronic device through the power terminal. The electric power modulation unit preferably includes a transformer module, an AC/DC conversion circuit, and a rectification circuit, and structure functions and connection relations of the transformer module, the AC/DC conversion circuit, and the rectification circuit are the same as those in the first embodiment and the second embodiment, and are not described anymore herein.

Figure 22:
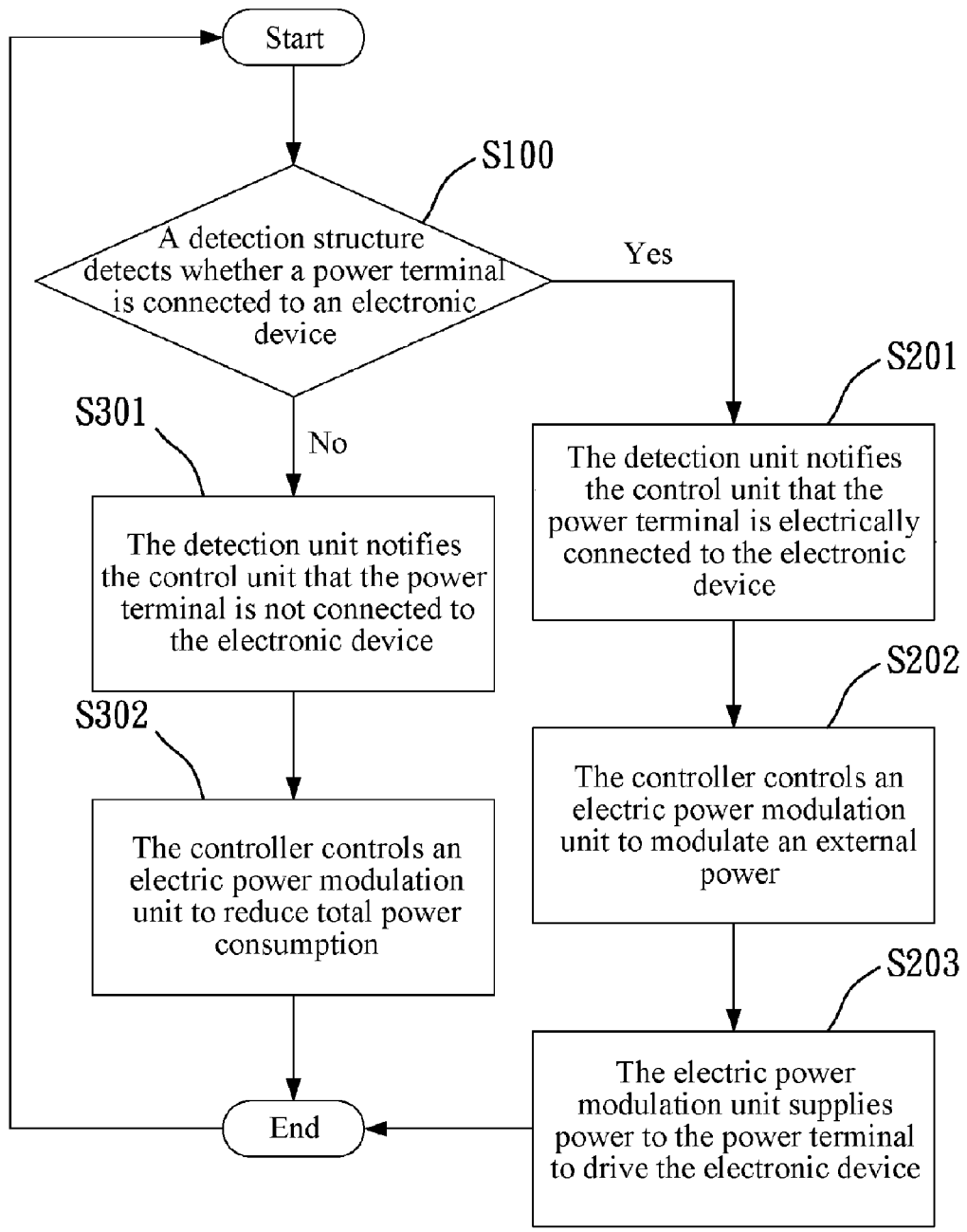
FIG. 22 is a flow chart of a power supply management method according to the present invention.

Referring to FIG. 22, the power supply management method of the present invention includes the following steps.

In Step S100: a detection result of the detection structure is read by the detection unit to judge whether a power terminal is electrically connected to an electronic device. When it is judged that the power terminal is connected to the electronic device, Step S201 is executed; when it is judged that the power terminal is not connected to the electronic device, Step S301 is executed.

In Step S201: the detection unit notifies the control unit that the power terminal is electrically connected to the electronic device, and the controller executes Step S202.

In Step S202: the controller controls the electric power modulation unit to modulate an external power, and the electric power modulation unit executes Step S203.

In Step S203: the electric power modulation unit modulates the external power, and modulates the external power into a proper output power signal for supplying power to the power terminal, so as to drive the electronic device.

In Step S301: the detection unit notifies the control unit that the power terminal is not connected to the electronic device, and a controller executes Step S302.

In Step S302: the controller controls an electric power modulation unit to stop supplying power to internal elements of the electric power modulation unit or only provide a very low standby voltage, so as to reduce a total power consumption of the electric power modulation unit.

In view of the above, the power adaptation device and the power supply management method thereof of the present invention use a special detection structure (an electronic detection contact or a mechanical probing terminal) to judge whether the power adaptation device is electrically connected to an electronic device, and can switch an electric power modulation unit in the power adaptation device to a standby state when it is judged that the power adaptation device is not connected to the electronic device, so that the total power consumption of the electric power modulation unit is reduced.

While the present invention has been described by the way of example and in terms of the preferred embodiments, it is to be understood that the invention need not to be limited to the disclosed embodiments. On the contrary, it is intended to cover various modifications and similar arrangements included within the spirit and scope of the appended claims, the scope of which should be accorded the broadest interpretation so as to encompass all such modifications and similar structures.

What is claimed is:

1. A power adaptation device, applicable to supplying power to an electronic device, comprising:
   a terminal seat;
   a mechanical probing terminal, wherein the probing terminal is movably disposed at the terminal seat, and is located between a power-on position and a power-off position;
   a detection unit, coupled to the probing terminal;
   an electric power modulation unit, wherein the electric power modulation unit is electrically connected to an external power; and
   a control unit, coupled to the electric power modulation unit and the detection unit;
   wherein the detection unit notifies the control unit whether the probing terminal is located at the power-on position or the power-off position, when the probing terminal is located at the power-on position, the control unit controls the electric power modulation unit to modulate the external power; and
   when the probing terminal is located at the power-off position, the control unit controls the electric power modulation unit to reduce a total power consumption.

2. The power adaptation device according to claim 1, wherein the electric power modulation unit comprises a transformer module.

3. A power adaptation device, applicable to supplying power to an electronic device, comprising:
   a terminal seat;
   a detection contact, disposed at the terminal seat;
   an electric power modulation unit, wherein the electric power modulation unit is electrically connected to an external power;
   a control unit, coupled to the electric power modulation unit; and a detection unit, coupled to the detection contact and the control unit, wherein the detection unit judges that the power adaptation device is connected to the electronic device or is not connected to the electronic device according to a voltage level of the detection contact and notifies the control unit;

wherein when the power adaptation device is connected to the electronic device, the control unit controls the electric power modulation unit to modulate the external power to supply power and drive the electronic device; and when the power adaptation device is not connected to the electronic device, the control unit controls the electric power modulation unit to reduce a total power consumption.

4. The power adaptation device according to claim 3, wherein the electric power modulation unit comprises a transformer module.

5. The power adaptation device according to claim 3, wherein the detection unit comprises an optical coupling switch, the optical coupling switch is coupled to a reference voltage, the detection contact, and the control unit, and the optical coupling switch outputs a voltage difference between the voltage level of the detection contact and the reference voltage to the control unit.

6. A power adaptation device, comprising:
a terminal seat;
a detection unit, fixedly sleeved over the terminal seat;
a probing terminal, partially embedded in the terminal seat and movably located between a power-on position and a power-off position, wherein the probing terminal is separated from the detection unit at the power-on position, and the probing terminal contacts and is conducted with the detection unit at the power-off position;
an electric power modulation unit, connected to an external power to provide a voltage source; and
a control unit, connected to the probing terminal, the detection unit, and the electric power modulation unit, so as to sense whether the probing terminal is located at the power-on position or the power-off position, and control the electric power modulation unit to supply power or stop supplying power;
wherein when the probing terminal is located at the power-off position, the control unit controls the electric power modulation unit to turn off and stop supplying the voltage source, and when the probing terminal is located at the power-on position, the control unit controls the electric power modulation unit to supply the voltage source.

7. The power adaptation device according to claim 6, wherein the control unit is a control chip.

8. The power adaptation device according to claim 6, wherein the control unit is attached to the electric power modulation unit.

9. A power adaptation device, comprising:
a terminal seat;
a detection unit, partially embedded and fixed in the terminal seat;
a probing terminal, partially embedded in the terminal seat and movably located between a power-on position and a power-off position, wherein the probing terminal contacts and is conducted with the detection unit at the power-on position, and the probing terminal is separated from the detection unit at the power-off position;
an electric power modulation unit, connected to an external power to provide a voltage source; and
a control unit, connected to the probing terminal, the detection unit, and the electric power modulation unit, so as to sense whether the probing terminal is located at the power-on position or the power-off position, and control the electric power modulation unit to supply power or stop supplying power;
wherein when the probing terminal is located at the power-off position, the control unit controls the electric power modulation unit to turn off and stop supplying the voltage source, and when the probing terminal is located at the power-on position, the control unit controls the electric power modulation unit to supply the voltage source.

10. The power adaptation device according to claim 9, wherein the control unit is a control chip.

11. The power adaptation device according to claim 9, wherein the control unit is attached to the electric power modulation unit.

12. A power supply management method, applicable to a power adaptation device, wherein the power adaptation device comprises a detection structure, a power terminal, a control unit, and an electric power modulation unit, the electric power modulation unit comprises a detection unit coupled to the detection structure, the control unit is coupled to the detection unit and the power terminal, the power adaptation device is electrically connected to an electronic device through the power terminal, the power supply management method comprising:
reading a detection result of the detection structure by the detection unit to judge whether the power terminal is electrically connected to the electronic device;
the detection unit notifying the control unit that the power terminal is not connected to the electronic device when judging that the power terminal is not connected to the electronic device; and
the control unit controlling the electric power modulation unit to stop supplying power to the electric power modulation unit to reduce a total power consumption of the electric power modulation unit.

13. The power supply management method according to claim 12, further comprising:
the detection unit notifying the control unit that the power terminal is electrically connected to the electronic device when the detection unit judges that the power terminal is connected to the electronic device;
the controller controlling the electric power modulation unit to modulate the external power; and
the electric power modulation unit modulating an external power and supplying power to modulate the power terminal, so as to drive and modulate the electronic device.

14. The power supply management method according to claim 12, wherein the electric power modulation unit further comprises a transformer module.

15. The power supply management method according to claim 12, wherein the detection structure is an electronic detection contact.

16. The power supply management method according to claim 12, wherein the detection structure is a mechanical probing terminal.

* * * * *